US006308162B1

(12) United States Patent
Ouimet et al.

(10) Patent No.: US 6,308,162 B1
(45) Date of Patent: Oct. 23, 2001

(54) METHOD FOR CONTROLLED OPTIMIZATION OF ENTERPRISE PLANNING MODELS

(75) Inventors: Kenneth J. Ouimet, Sacramento; Charu V. Chaubal, Fair Oaks, both of CA (US)

(73) Assignee: Khimetrics, Inc., Sacramento, CA (US)

( * ) Notice: Subject to any disclaimer, the term of this patent is extended or adjusted under 35 U.S.C. 154(b) by 0 days.

(21) Appl. No.: 09/084,156

(22) Filed: May 21, 1998

Related U.S. Application Data

(60) Provisional application No. 60/049,948, filed on May 21, 1997, and provisional application No. 60/049,826, filed on May 21, 1997.

(51) Int. Cl.[7] .................................................... G06F 17/60
(52) U.S. Cl. .................................. 705/7; 705/8; 706/13; 706/16; 706/19
(58) Field of Search .................................. 705/1, 7, 8, 9; 706/1, 38, 45, 13, 16, 19, 46

(56) References Cited

U.S. PATENT DOCUMENTS

| | | | | |
|---|---|---|---|---|
| 4,887,218 | * | 12/1989 | Natarajan | 705/8 |
| 5,377,095 | | 12/1994 | Maeda et al. | . |
| 5,442,730 | * | 8/1995 | Bigus | 706/19 |
| 5,521,814 | * | 5/1996 | Teran et al. | 705/7 |
| 5,630,070 | * | 5/1997 | Dietrich et al. | 705/8 |
| 5,754,857 | * | 5/1998 | Gadol | 709/203 |
| 5,767,848 | * | 6/1998 | Matsuzaki et al. | 705/10 |
| 5,946,662 | * | 8/1999 | Ettl et al. | 705/8 |
| 5,950,170 | * | 9/1999 | Pan et al. | 706/19 |
| 5,963,911 | * | 10/1999 | Walker et al. | 705/8 |

FOREIGN PATENT DOCUMENTS

| | | |
|---|---|---|
| 0 356 191 | 2/1990 | (EP) . |
| 0 639 815 | 2/1995 | (EP) . |

OTHER PUBLICATIONS

Dauer et al. "A multi-objective optimization model for water resources planning;", Dec. 1979.*
Ray et al. "Master production scheduling for a process industry environment"; International Journal of Operation Management v14n10, Dec. 1994.*
Gross et al. A Multiple-Objective Planning Methodology For Information Service Managers:; Information Processing & Management vol. 15 pp 155–167, Jan. 1979.*

(List continued on next page.)

*Primary Examiner*—Tariq R. Hafiz
*Assistant Examiner*—Romain Jeanty

(57) ABSTRACT

A computer-implemented method and system for controlled optimization of enterprise planning models is provided. This is accomplished by first defining an auxiliary objective function, which depends on the same variables as the model, or a subset thereof. An effective objective function is then constructed from the primary objective function by subtracting the auxiliary objective function multiplied by a weighting factor. The effective objective function is then optimized for a whole range of weighting values, yielding a table that describes how the primary objective function varies according to different values of the weighting factor. Optimization of the effective objective function with a given value of the weighting factor results in a particular value for the auxiliary objective. Thus, this computed table essentially provides a relationship between different realized values of the primary objective, the auxiliary objective, and all the variables of the enterprise planning model. The user is further provided with a way to specify a target value for the auxiliary objective to attain, and then use the table obtained previously to interpolate the value for the weighting factor that corresponds to the target value. This interpolated value for the weighting factor is then inserted into the effective objective function. This effective objective function is optimized, yielding the set of decisions which optimize the primary objective function while at the same time satisfying the constraint that auxiliary objective achieve a target value.

2 Claims, 13 Drawing Sheets

OTHER PUBLICATIONS

"Promoman", Promotion Management System, Nielsen Marketing Research, 1992.

"The Robustness Of Retail–Level Price Elasticity Estimates" By Ruth N. Bolton, Journal of Retailing, vol. 65, No. 2, Summer 1989.

"Competing On Price: The Role Of Retail Price Advertisements In Shaping Store–Price Image" By Cox et al., Journal of Retailing, vol. 66, No. 4, Winter 1990.

"Reassessing Brand Loyalty, Price Sensitivity, And Merchandising Effects On Consumer Branch Choice" By Allenby et al., Journal of Business & Economic Statistics, Jul. 1955, vol. 13, No. 3.

"Increased Consumer Sales Response Though Use Of 99–Ending Prices" By Schindler et al., Journal of Retailing, vol. 72(2), pp. 187–199.

* cited by examiner

Select Goals

>_

Select Primary Goal

1. Select Predefined Primary Goal
        a. Maximize Gross Profits:

$$\Pi = \sum Q_i(P_i - C_i)$$

b. Maximize Total Sales:

$$\Pi = \sum Q_i P_i$$

2. Define New Primary Goal

Select Auxiliary Goal

3. Select Predefined Auxiliary Goal
        c. Maintain Overall Price Image:

$$\phi = \frac{1}{N} \sum_{i=1}^{N} \frac{P_i}{\overline{P}_i} \times w_i ,$$

4. Define New Auxiliary Goal

Q. Return to Main Menu

Figure 4B

| ψ | Π | φ |
|---|---|---|
| 1 | $10,000 | 0 |
| 2 | $11,000 | 1 |
| 3 | $12,000 | 2 |
| 4 | $13,000 | 3 |
| 5 | $14,000 | 2 |
| 6 | $15,000 | 1 |
| 7 | $16,000 | 2 |
| 8 | $17,000 | 3 |

Constraint Overview Table

| $\phi^{targ}$ | $\psi^{high}$ | $\psi^{low}$ |
|---|---|---|
| 0.5 | 1 | 2 |
| 2.5 | 3 | 4 |
| 2.5 | 4 | 5 |
| 3.5 | NULL | NULL |

$\{\phi^{bound}\}$

Figure 5B

Enter Weighting Range

>_

1. Select Minimum Value: $\psi^{min}$

2. Select Maximum Value: $\psi^{max}$

3. Select Resolution: $\delta\psi$

4. Continue Constraint Mapping Routine

Figure 5C

| Constraint Overview Table | |
|---|---|
| ... | ... |
| $\psi = \alpha_1$ | $\phi = \beta_1$ |
| $\psi = \alpha_2$ | $\phi^{low} = \beta_2$ |
| $\phi^{low} < \phi^{targ} < \phi^{high}$ | |
| $\psi = \alpha_3$ | $\phi^{high} = \beta_3$ |
| $\psi = \alpha_4$ | $\phi = \beta_4$ |
| ... | ... |

METHOD FOR CONTROLLED OPTIMIZATION OF ENTERPRISE PLANNING MODELS

CROSS-REFERENCE TO RELATED APPLICATION

This application claims the benefit of U.S. Provisional Application Number 60/049,948, filed May 21, 1997, and U.S. Provisional Application Number 60/049,826, filed May 21, 1997, both of which are specifically incorporated herein, in their entirety, by reference.

BACKGROUND OF THE INVENTION

1. Field of the Invention

The present invention relates to enterprise planning models, and more particularly, to controlling the optimization of a retail demand model through the application of one or more strategic constraints.

2. Description of Related Art

As technology continues to penetrate into all aspects of the economy, a wealth of data describing each of the millions of interactions that occur every minute is being collected and stored in on-line transaction processing (OLTP) databases, data warehouses, and other data repositories. This information, combined with quantitative research into the behavior of the value chain, allows analysts to develop enterprise models, which can predict how important quantities such as cost, sales, and gross margin will change when certain decisions, corresponding to inputs of the model, are made. These models go beyond simple rules-based approaches, such as those embodied in expert systems, and have the capability of generating a whole range of decisions that would not otherwise be obvious to a designer of rules.

There is however a problem with the use of model-based decision-making tools. As the decision-making process is automated, the operational decisions that are recommended by the model may begin to deviate from broader considerations that are not specifically built into the enterprise planning model. The reason for this is that an economic model can realistically only succeed on either a small scale or large scale, but not both. Incorporating both small scale decisions and large scale decisions in a single enterprise planning model would result in a model of enormous complexity, making the optimization of the enterprise planning model computationally impractical, and economically inefficient.

The importance of this problem can be illustrated with an example from the retail industry. A retailer can use a demand model to accurately forecast each item's unit sales given the item's price and other factors. However, if the demand model is used directly to optimize pricing decisions, it will generate prices that vary greatly from those of a human pricing manager. This is because a demand model has no knowledge of the enterprise's strategic objectives, and therefore generates prices that do not reflect the company's overall pricing policy. This inability to align and optimize an enterprise's operational decisions with its strategic objectives is a huge problem, and results in a billion-dollar inefficiency in the retailing industry alone.

Thus, it would be desirable to exploit the power of enterprise planning models that work well on a small scale, while providing control on a larger scale.

SUMMARY OF THE INVENTION

The present invention provides a computer-implemented method and system for controlling the optimization of an enterprise planning model while simultaneously satisfying at least one strategic constraint not taken into account in the enterprise planning model. In a preferred embodiment, a user is presented with a menu on a display device. Using an input device, the user first selects a primary goal to be realized—e.g., maximize gross profits. The primary goal is represented by a primary objective function which is dependent upon a set of operational variables. Each of the operational variables represents a single operational decision that the user seeks to optimize in order to reach the primary goal. Next, the user selects an auxiliary goal that the user would also like to be realized. The auxiliary goal is represented by a constraint function that is dependent upon a subset of the set of operational variables.

Next, an effective objective function is constructed by combining the primary objective function with the constraint function multiplied by a weighting factor. The resulting effective objective function depends on the same set of operational variables. The effective objective function is then optimized with respect to each of the operational variables, with the enterprise data providing physical constraints on the optimization. As a result of the optimization, optimal values for each of the operational variable is obtained. The optimal values of the operational variables represent a set of operational decisions that should achieve the primary goal and auxiliary goal.

The effective objective function can be optimized through a range of values of the weighting factor, with the results stored in a table. This computed table essentially provides a relationship between different optimized values of the primary goal, the auxiliary goal, and the values for the operational variables. The user can then be provided with a way to specify a target value for the auxiliary goal to attain, and then use the table to interpolate the value for the weighting factor that corresponds to the target value. This interpolated value for the weighting factor is then inserted into the effective objective function. The effective objective function is optimized, yielding the set of operational decisions which optimize the primary objective fuinction while at the same time satisfying the constraint that the auxiliary goal achieve the target value.

BRIEF DESCRIPTION OF THE DRAWINGS

FIG. 4B is a picture of an example of the input prompts displayed on the display device in a preferred embodiment of the Function Selection routine;

FIG. 5B shows examples of data structures stored in memory for a Constraint Overview table and a corresponding list of bounds;

FIG. 5C is a picture of an example of the input prompts displayed on the display device in a preferred embodiment of the Constraint Mapping routine;

DETAILED DESCRIPTION OF PREFERRED EMBODIMENTS

The following description is present to enable one of ordinary skill in the art to make and use the invention and is provided in the context of a patent application and its requirements. Various modifications to the illustrated embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
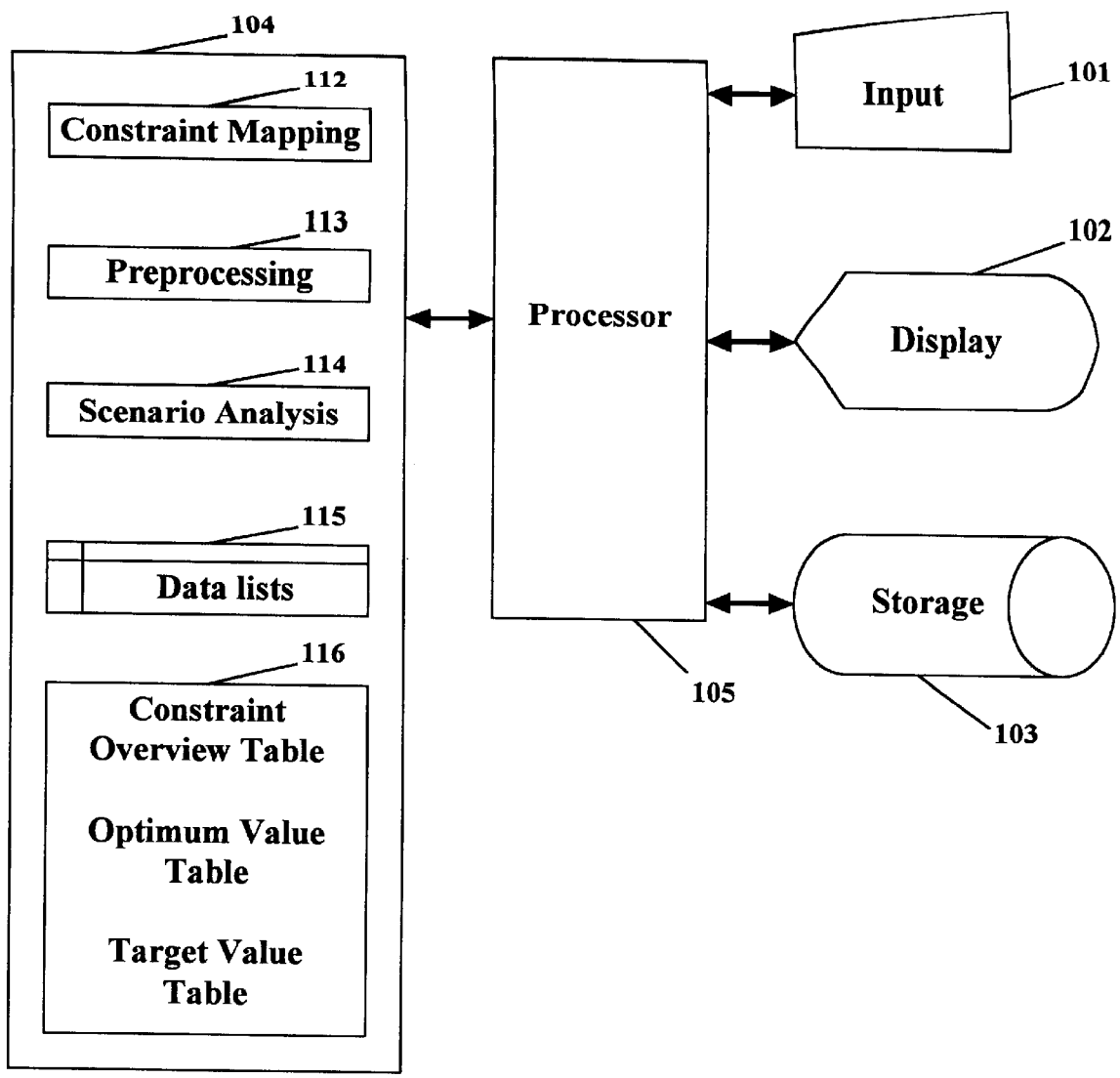
FIG. 1 is a high-level block diagram of a general-purpose computer system used in accordance with the present invention.

As shown in FIG. 1, a system includes: an input device 101 such as a keyboard, through which a user enters commands, inputs fuinctions, etc.; a display device 102 for displaying tables, etc.; a storage device 103 such as hard disk drive for storing results and enterprise data; a memory 104 for storing program instructions, tables and results; and a processor 105 for performing various kinds of processing and controlling the overall operation of the system.

The memory 104 includes at least the following: a Constraint Mapping portion 112 for generating an overview of the constrained decisions; a Preprocessing portion 113 for preparing data for subsequent operations; a Scenario Analysis portion 114 for generating results for specific scenarios; a Data list 115 portion for storing lists necessary for the manipulation of data; and a Table portion 116 for storing tables and results.

It will be understood that the described embodiments of the present invention are embodied as computer instructions stored in memory 104 and executed by processor 105. These instructions can also be stored on a computer readable medium, such as a floppy disk, CD ROM, etc., and can also be transmitted in a network such as the internet, an intranet, etc., via a carrier wave embodying the instructions.

Operation of the Invention

The operation of a preferred embodiment of the present invention will now be described in brief with reference to FIGS. 2 and 3 before being described in detail with reference to FIGS. 4 to 7.

Figure 2:
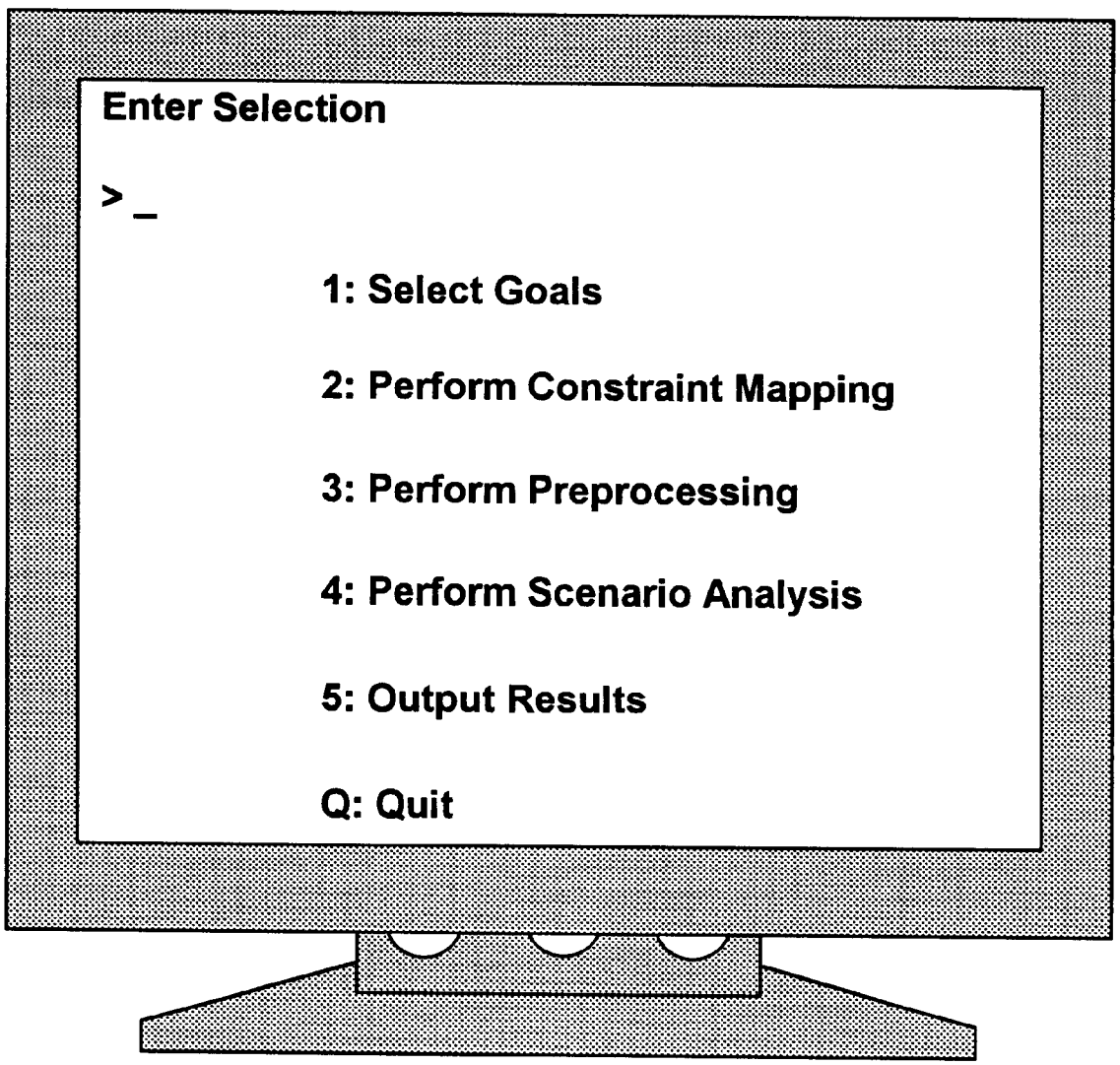
FIG. 2 is a picture of an example of an input menu displayed on a display device.
Figure 3:
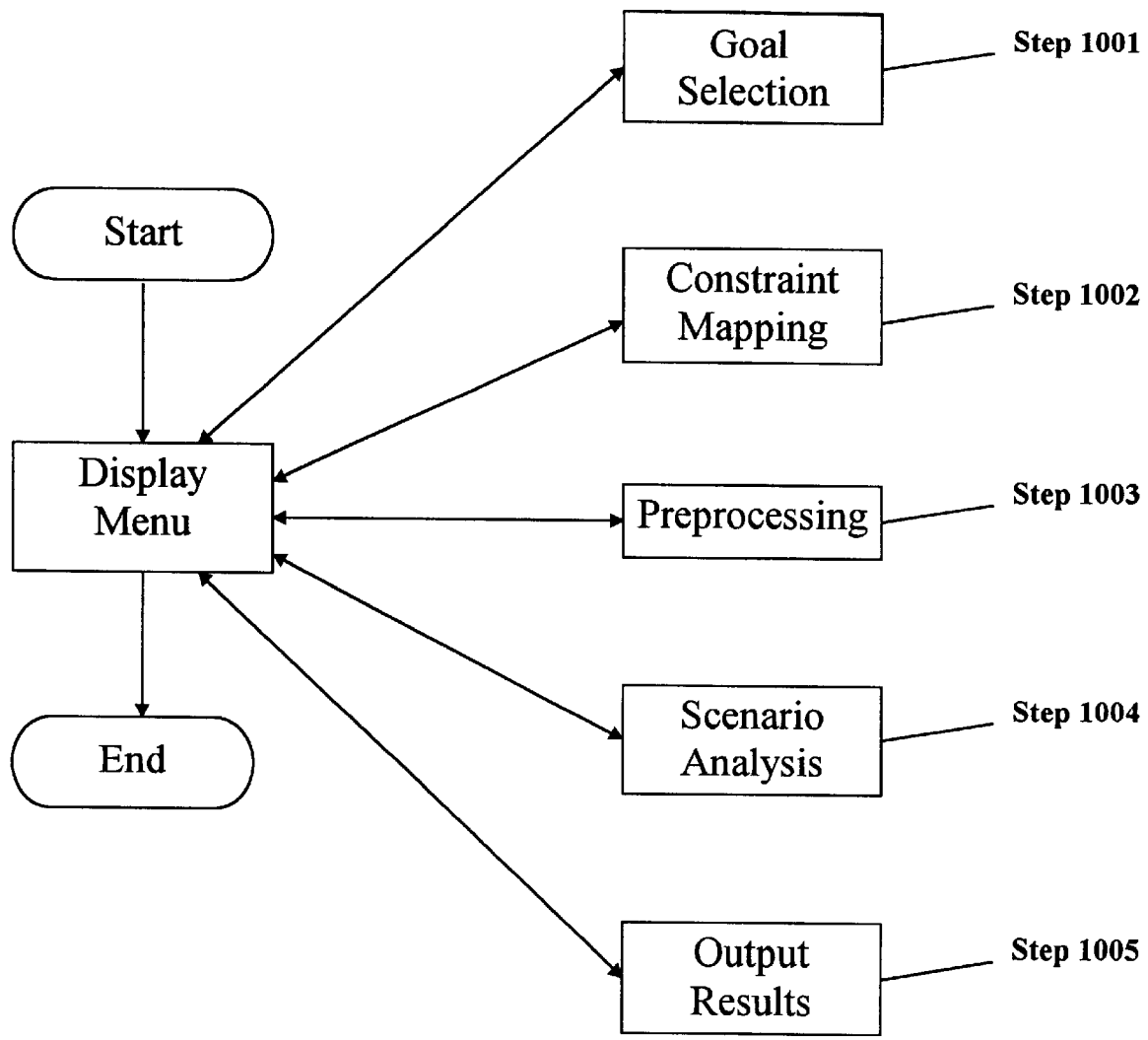
FIG. 3 is a flowchart describing the overall operation of the system.

A menu as shown in FIG. 2 is presented to the user on the display 102. At this time, the user enters one of the following selections through the input device 101: '1' to select primary and auxiliary goals, '2' to perform the constraint mapping, '3' to perform the preprocessing, '4' to perform the scenario analysis, '5' to output results to the storage device 103, and 'Q' to terminate use of the system. Other appropriate methods and formats of input can, of course, be used.

The processor 105 receives the entered information, and the situation of the system is passed to one of the appropriate steps described below, according to the inputted value. This is represented schematically in FIG. 3.

(Step 1001): Goal Selection

At this step, the user selects a primary goal to be analyzed, along with an auxiliary goal. The details thereof are discussed below in conjunction with FIG. 4. The primary goal of the present invention can be any standard goal of an enterprise planning model, such as the maximization of gross profits. The auxiliary goal can be any strategic constraint that the user seeks to analyze in conjunction with the primary goal, for example, increase market share or gross margin. As an example, a retail pricing manager may seek to set prices such that gross profits are maximized while at the same time, meeting the store's other long term goals, such as increasing overall market share. The pricing manager would thus choose "maximize net profits" as a primary goal and "increase market share" as an auxiliary goal.

It will be appreciated by those having ordinary skill in the art that prior art enterprise planning models are limited by the physical constraints of the enterprise planning model. Thus, the operational decisions that are recommended by the model will likely deviate from broader considerations that are not specifically built into the enterprise planning model. This is a primary reason that retailers have traditionally avoided the use of demand models to help them price their products; the results do not reflect the company's overall pricing policy. As will be appreciated by the discussion below, by incorporating strategic constraints into the enterprise model, the present invention provides an enterprise planning model that goes far beyond the physical constraints of traditional enterprise planning models.

(Step 1002): Constraint Mapping

The behavior of the primary goal is determined over a range of values of the auxiliary goal. In the example provided above, gross profits would be maximized for a range of expected market share values. The details of the Constraint Mapping routine are discussed below in conjunction with FIG. 5A.

(Step 1003): Preprocessing

Figure 6:
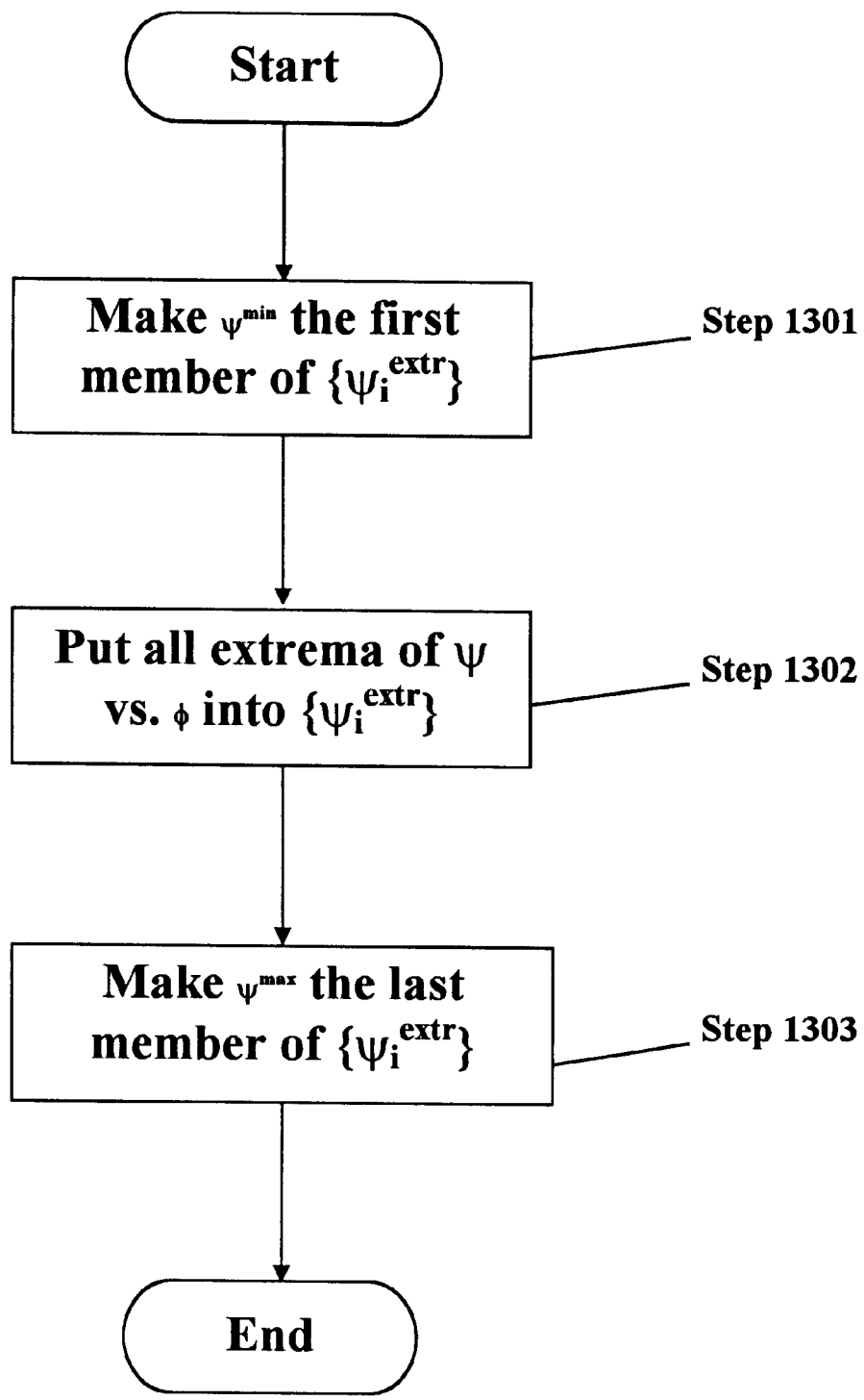
FIG. 6 is a flowchart of a preferred embodiment of the Preprocessing routine.

In order to provide the user with an efficient method to analyze various scenarios for achieving the primary and auxiliary goals (i.e., Scenario Analysis, discussed below), the data generated in the Constraint Mapping step is preprocessed The details thereof are discussed below in conjunction with FIG. 6.

(Step 1004): Scenario Analysis

In this step, the user defines a set of scenarios, i.e., projected values for the auxiliary goal that the user would like to achieve. For each scenario defined, a set of operational decisions are provided to the user that maximize the primary goal while simultaneously satisfying the auxiliary goal. This step is performed for each scenario selected by the user. The details thereof are discussed below in conjunction with FIG. 7. Referring to the example provided above, the present invention provides the pricing manager with the necessary information to achieve both the primary goal (e.g., maximize gross profits) and the auxiliary goal (e.g., increase market share)—results that are not provided in prior art enterprise models.

(Step 1005): Output Results

The operational decisions, primary goal, and auxiliary goal determined for each scenario are placed in the storage device 103. Thus, in the retail pricing example given above, the retail pricing manager would be provided with the optimum prices for each item to be sold that would allow the store to meet both the primary goal of maximizing gross profits, and the auxiliary goal of increasing market share.

Goal Selection

Figure 4A:
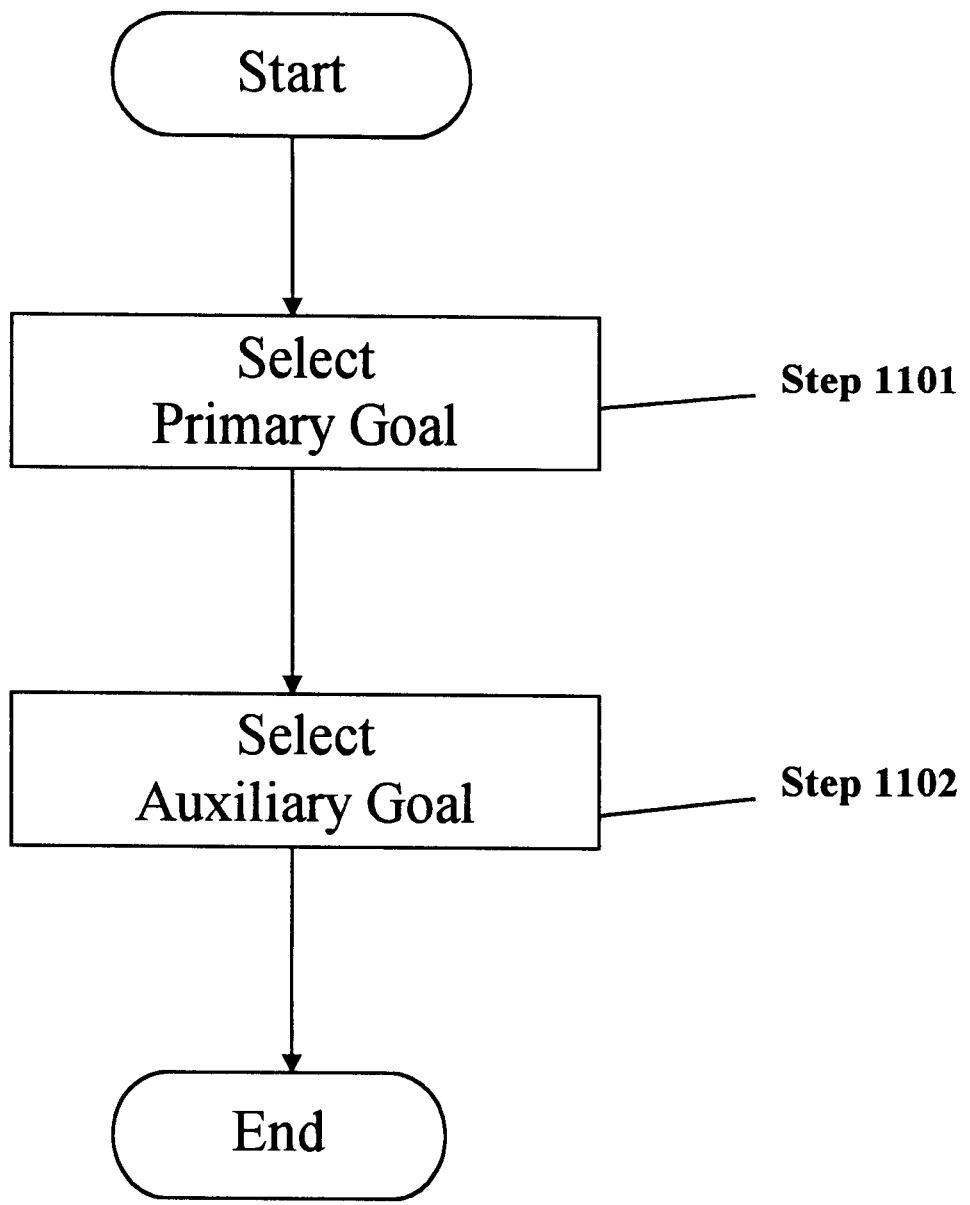
FIG. 4A is a flowchart of a preferred embodiment of the Function Selection routine.
Figure 5A:
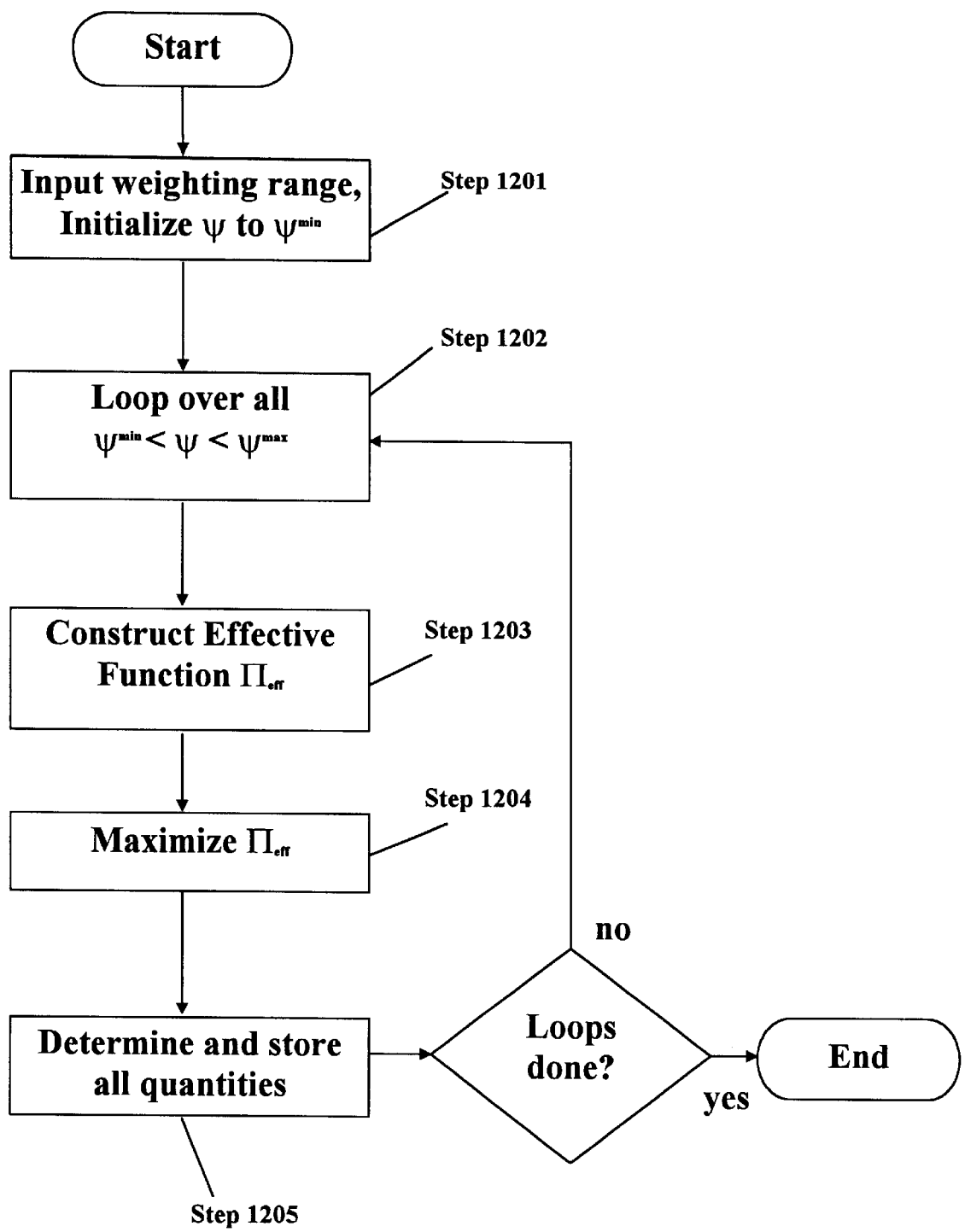
FIG. 5A is a flowchart of a preferred embodiment of the Constraint Mapping routine.

A preferred embodiment of this routine will be described with reference to FIGS. 4A and 4B. The user is presented with a menu on display 102, such as illustrated in FIG. 4B, to prompt the user through the Goal Selection routine as illustrated in FIG. 4A. It should be appreciated that other appropriate methods and formats of input can, of course, be used, and that the menu presented in FIG. 4B is presented for illustrative purposes only.

(Step 1101)

The user selects the primary goal to be realized—e.g., maximization of gross profits. The primary goal is represented by a primary objective function Π which depends upon a set of variables $\{X_i\}$, each of which represent a single operational decision. For example, in the field of retail, a primary goal is normally the gross profit, $$\pi = \sum_i Q_i(P_i - C_i),$$

where $Q_i = Q_i(P_i)$ is the predicted demand $Q_i$ for an item i based on its price $P_i$, and $C_i$ is the item's cost. In this case the variables $\{X_i\}$ would be the set of all prices $\{P_i\}$. The primary goal may be defined by any model that attempts to optimize many operational decisions, i.e. those decisions that occur on a lower level. In a preferred embodiment, a plurality of objective functions corresponding to each of a plurality of predetermined primary goals will be stored in storage 103, and provided to the user on display device 102. However, it is anticipated that the user can modify existing primary goals and/or create new primary goals.

(Step 1102)

In addition to the primary goal, the user also selects the auxiliary goal, which represents a strategic constraint on the enterprise model. This type of constraint represents some global, large-scale objective that is not included in the primary objective function Π that provides the definition of the primary goal. The auxiliary goal is represented by a constraint function φ, and should depend on the same set of variables $\{X_i\}$ that the primary objective function Π depends upon, or some subset thereof. Ideally the constraint function φ should be defined so that it reflects some aggregate property that the variables should attain. Significantly, the constraint function φ can be virtually any function that the user feels is important.

For example, the equation for the gross profit, which is given above, can be used as the primary objective function whose value is maximized by adjusting prices on all items. Once maximized, the result is a set of prices for each item that maximizes the overall gross profit. On the other hand, the user might also like to set prices so as to achieve a particular level of sales—i.e., choose an auxiliary goal of achieving a particular level of sales. A suitable strategic constraint function for the total amount of sales, can be define as $$\phi = \sum_i Q_i P_i$$

where $Q_i$ and $P_i$ are defined as above. This strategic constraint function depends on all prices and demands, and for a given value of total sale, there could be many combinations of quantities $(Q_i)$ and prices $(P_i)$ that would give the same answer. However, the actual combination chosen to optimize total sales will depend upon the optimization of the primary objective function Π, as will be discussed below.

The addition of an auxiliary goal to the enterprise model allows the user to analyze enterprise planning decisions otherwise not available in the prior art. For example, when pricing their products, retail pricing managers generally seek to have their prices reflect a certain image of their stores. A discount retailer would like its prices to be perceived as being lower than other retailers. This so-called "price image" is an example of a strategic constraint; it does not correspond to any physical constraint on the prices, and it does not directly correspond to any single decision made by a enterprise planning model. Instead, it is a function of all the prices in the market, and it represents a higher-level property that the pricing manager would like to be able to choose and control with precision.

As illustrated in FIG. 4B, a preferred embodiment includes, in addition to other auxiliary goals, a mathematical definition of the price image. Thus, the present invention could be used to control the prices predicted by any demand model to ensure that a particular desired price image is attained. A preferred definition of a price image is $$\phi = \frac{1}{N} \sum_{i=1}^{N} \frac{P_i}{\overline{P}_i} \times w_i,$$

where $\overline{P}_i$ is the average price of item i in the market of interest, $w_i$ is a weighting function for item i and N is the total number of items in the model. The weighting function is suitably defined such that other factors can modify the contribution of a single item to the overall price image. For example, $w_i$ could be proportional to the sales of the item, so that items that are not frequently sold do not influence the price image as much as items with high sales. In the absence of any relevant information, the weighting functions may simply be set to 1. It should be apparent that other definitions of price image can be utilized, and that the above definition is presented for illustrative purposes only.

The price image can be used in conjunction with the present invention to address a long-standing problem with retail demand modeling. Retailers have found that if a demand model is used to optimize prices on items to yield the greatest gross profit, the model will invariably choose prices that are higher than what a human price manager would have intuitively chosen. The typical outcome is that, in the short term, shoppers continue to buy products at these higher prices, and this does in fact yield a higher gross profit. However, over the long term, customers become aware that the price image of the stored has risen, and eventually turn to other stores. Thus, controlling the price image from the outset can prevent this problem with different consumer responses on different time scales. By determining one's price image from existing prices, a retailer could then use a demand model, in the context of the present invention, to obtain greater profit even while maintaining the same overall price image.

Constraint Mapping

Because a strategic constraint, such as price image, does not represent a physical restriction on the system, it is not necessary that it be met rigorously. Rather, it is more desirable to vary the constraint over a range of scenarios, and then determine which set of predicted decisions aligns most favorably with the primary and auxiliary goals. The objective is to have control over the decisions being made, without being locked to a single set of decisions. For this reason, it is not practical to use conventional constraint-based optimizations, which are usually employed for physical constraints. A more efficient method for treating strategic constraints is described below.

By obtaining solutions over a broad range of scenarios, the user of the invention obtains a picture of how the optimal predictions vary according to changes in the desired large-scale goal. After seeing this picture, the user may target a specific large-scale scenario to be realized and subsequently obtain the set of decisions that are the most optimal, given the constraints of that particular scenario. The method can be used with a wide variety of models and objective functions.

The input to this routine includes the primary goal as represented by the primary objective function Π, the set of independent variables $\{X_i\}$ that affect the primary objective function Π, and a mathematical definition, i.e., the constraint function $\phi$, for the auxiliary goal, all of which are stored in memory 104 and/or storage 103. A preferred embodiment of this routine will be described with reference to FIG. 5A.

(Step 1201)

At this step, the user is prompted to select the extent to which the auxiliary goal will affect the primary goal. To achieve this, the user enters a minimum value $\psi^{min}$, a maximum value $\psi^{max}$, and the resolution $\delta\psi$ which represents step increments to be tested between $\psi^{min}$ and $\psi^{max}$. FIG. 5C illustrates user prompts that may be displayed on display 102 in this step. The actual value of each of these variables will depend upon the particular situation being studied. To begin the constraint mapping, the value for $\psi$ is initialized to $\psi^{min}$.

(Step 1202)

A loop is begun in which the variable $\psi$ takes on values between $\psi^{min}$ and $\psi^{max}$ incremented by $\delta\psi$.

(Step 1203)

The routine constructs an effective objective function:

$$\Pi_{eff}=\Pi-\phi\psi.$$

It is important to note $\Pi_{eff}$ depends on the same variables $\{X_i\}$ as the primary objective function, and represents an effective goal. As can be seen above, the effective objective function is constructed by taking the primary objective function and subtracting the constraint function as weighted by the value of $\psi$.

(Step 1204)

At this step, the effective objective function $\Pi_{eff}$ is maximized with respect to all the independent variables, and the enterprise data stored in the storage device 103. A preferred method of maximizing $\Pi_{eff}$ is the method of simulated annealing, which is one of the few techniques available for solving discrete, nonlinear, high-dimensional functions. This technique is known in the art and is documented in the following reference, which is herein incorporated by reference: W. Press et. al, *Numerical Recipes: The Art of Scientific Computing*, Cambridge University Press, New York (1992).

The simulated annealing technique is particularly suited for this problem for several reasons. In a typical situation there are possibly thousands of independent variables that correspond to thousands of operational decisions, and there are very few techniques that can optimize an objective function with this many variables in an efficient amount of time. In addition, the primary objective function and the constraint function will typically depend upon many discrete variables, for example, price which can only change in units of cents. The simulated annealing technique is able to handle this complication, and in fact is ideally suited for optimizations involving discrete variables. It is anticipated that other optimization routines can be utilized and may be more efficient in some situations, for instance, when the types of decisions that influence the objective function are captured by continuous variables, or when the system to be studied is very small.

The variable $\psi$ serves the purpose of being a reward or a penalty. When the value of $\psi$ is equal to zero, the effect of the auxiliary function on the aforementioned optimization procedure is not felt at all, and optimization of the effective objective function amounts to an unconstrained optimization of the primary goal. Therefore, it would generally be useful to define $\psi_{min}$, $\psi_{max}$, and $\delta\psi$ such that $\psi$ is zero during at least one point in the iteration procedure. If the value of $\psi$ is large and positive, then the constraint acts as a penalty, and the optimization will be skewed towards a solution that results in a lower numerical value of the constraint function. If the value of $\psi$ is large and negative, then the constraint acts as a reward, and the optimization will be skewed towards a solution that results in a higher numerical value of the constraint function. The magnitude of $\psi$ serves to fix the relative weight of the constraint, and accordingly different values for $\psi$ will result in different numerical values of the constraint that will be attained which the objective function is optimized.

(Step 1205)

The output from step 1204 is the maximized value of $\Pi_{eff}$ and the resulting values for the independent variables $\{X_i\}$. These independent variables are stored in an Optimum Value table in the Table portion 116 of memory 104. The values of the constraint function $\phi$ and the primary objective function Π are determined from these variables, and subsequently, Π, $\phi$, and $\psi$ are all stored in the Constraint Overview table in the Table portion 116 of memory 104, as shown in FIG. 5B.

Next, the value of $\psi$ is incremented by $\delta\psi$, and a judgment is made as to whether $\psi$ is greater than $\psi^{max}$. If it is not, the routine goes back to step 1202. If it is, the Constraint Mapping procedure terminates.

Figures 10, 11:
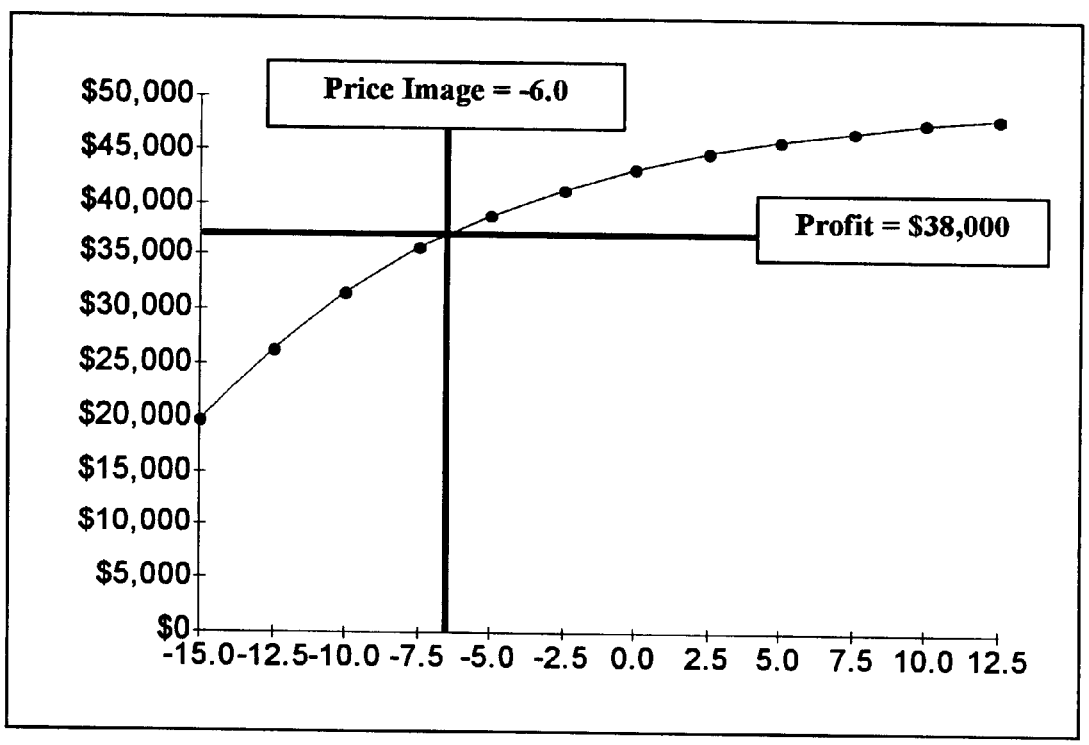
FIG. 10 gives a schematic of the determination of quantities used for the interpolation of the Constraint Overview table.
FIG. 11 gives a graph presented on the display device of the data contained in an example Constraint Overview table, and an example of the targeting of a particular Price Image.

The information stored in the Constraint Overview table provides a concise summary of the behavior of the target market—i.e., a summary of the effect that the auxiliary goal will have on the primary goal. This data may be stored in a file or printed, or passed on to another routine. For example, since the table contains various primary goal values for each set of values determined from the auxiliary goal, data from the table may be used as input to a visualization routine or package. In a preferred embodiment, the user is provided with an intuitive, graphical view of the dependence of the primary goal on the strategic constraint, as illustrated in FIG. 11, which uses data unrelated to FIG. 5B.

After obtaining data in the Constraint Overview table, and possibly visualizing it or comprehending it in some other manner, the user may choose to terminate the operation of the system, or proceed to the Preprocessing Routine.

Preprocessing Routine

In a preferred embodiment, before the data contained in the Constraint Overview table is used to generate a forecast for a specific scenario chosen by the user (see discussion of Scenario Analysis below), it is preprocessed into a computationally efficient form. This step generates information for use in subsequent operations. Without preprocessing, the subsequent Scenario Analysis routine would have to be performed in a much less efficient manner, and the additional computation time would likely be undesirable for the user. A preferred embodiment of this routine will be described with reference to FIG. 6.

(Step 1301)

A list $\{\psi_i^{extr}\}$ is created, and $\psi^{min}$ is made the first entry in the list.

(Step 1302)

The values of $\psi$ in the Constraint Overview table are scanned from $\psi^{min}$ to $\psi^{max}$. Anytime an extremum is found, that is, a point where the constraint function φ attains a local minimum or maximum, the value of ψ at this point is added to the list $\{\psi_i^{extr}\}$. As will be discussed further below, the local minimums and maximums are obtained so that any value in the weighting range, $\psi^{min}$ to $\psi^{max}$, can be efficiently interpolated.

(Step 1303)

$\psi^{max}$ is made the last entry in $\{\psi_i^{extr}\}$.

As illustrated in FIG. 5B, the list $\{\psi_i^{extr}\}$ contains the values (1, 4, 6, 8). Thus the list $\{\psi_i^{extr}\}$ contains the ψ value of endpoints of successive segments in the Constraint Overview table where the constraint function φ, representing the auxiliary goal, is monotonic increasing or monotonic decreasing. In the trivial case where the constraint function φ is monotonic increasing or monotonic decreasing throughout the entire list, then $\{\psi_i^{extr}\}$ only contains the lowest and highest values of ψ, respectively, in the Constraint Overview table.

Scenario Analysis Routine

Figure 7:
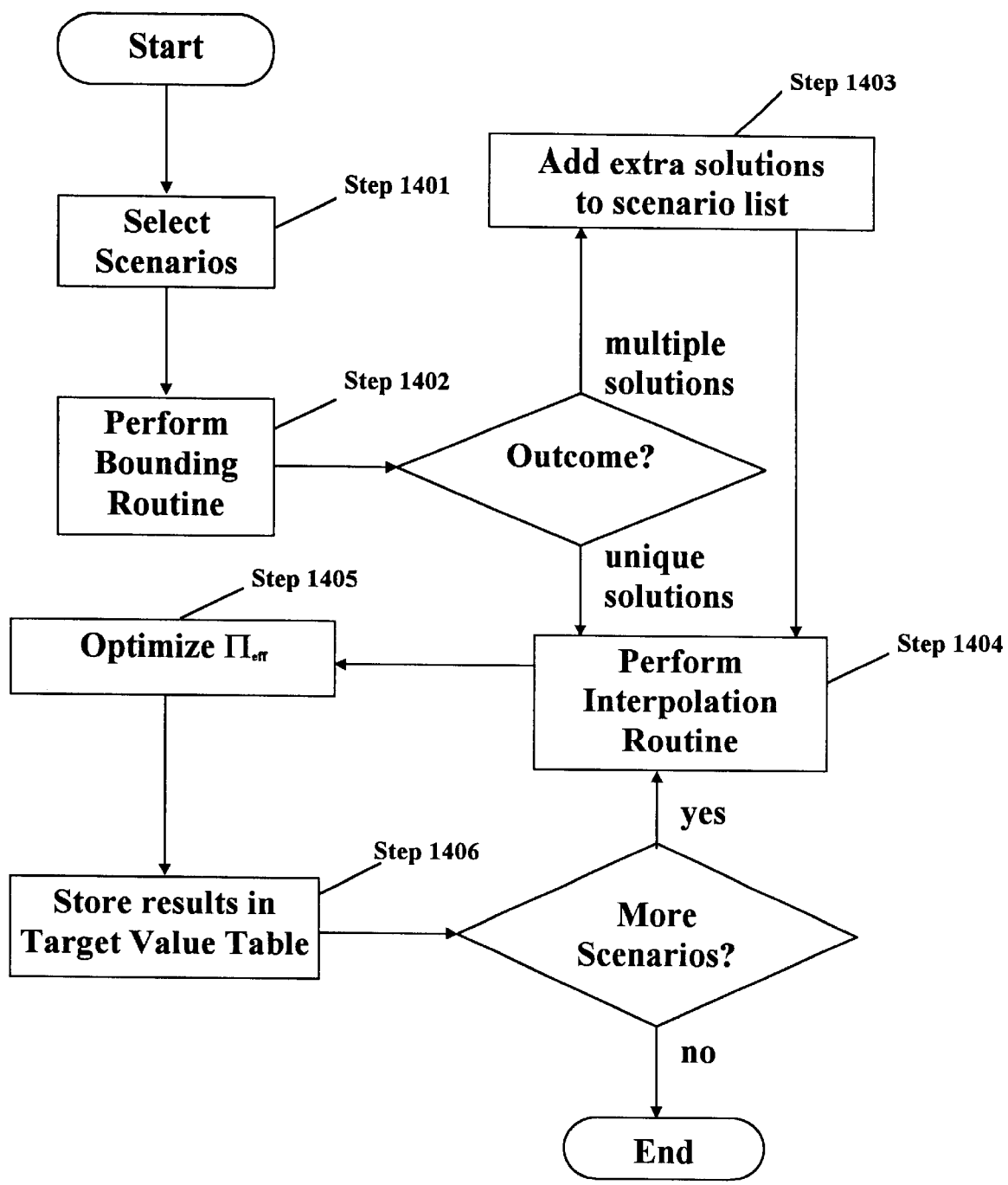
FIG. 7 is a flowchart of a preferred embodiment of the Targeting routine.

A preferred embodiment of the Scenario Analysis routine will be described with respect to FIG. 7.

(Step 1401)

The user selects a set of scenarios—i.e., specifies values for the auxiliary goal that the user would like to see attained—for example, a particular gross margin or total sales.

(Step 1402)

Control of the system is first passed to the Bounding routine. The input to this routine is the Constraint Overview table obtained in the mapping routine, and all the values of the constraint to be targeted, as well as the list $\{\psi_i^{extr}\}$. The output from the Bounding routine are the values $\psi^{low}$ and $\psi^{high}$ which correspond to the entries in the table which bound all target values of the constraint function φ.

(Step 1403)

If a particular target occurs in more than one place in the Constraint Overview table, that is, if there are multiple solutions, then each of these becomes a scenario of its own, and is added onto the list of targeted constraint values.

If the values of $\psi^{low}$ and $\psi^{high}$ for a particular constraint target are null, this indicates that the desired scenario is not contained within the bounds of the Constraint Overview table. In this case, the situation of the routine skips directly to step 1406. If the user wishes to analyze the particular scenario that was rejected, then the Constraint Mapping routine may be run again, with different values of $\psi^{min}$ and $\psi^{max}$ in order to extend the range of the analysis. If this extended map still does not capture the desired scenario, then it is likely that the user has chosen to analyze a scenario that is impossible to attain.

(Step 1404)

For each scenario that does not have null values for the bounds, the values $\psi^{low}$, $\psi^{high}$, the particular constraint target and the Constraint Overview table are passed to the Interpolation Routine. The output from this routine is an estimate of the value of ψ (denoted $\psi^{est}$) that, when used to optimize the effective objective function, will yield a value of the constraint function φ close to constraint target.

(Step 1405)

The effective objective function is constructed:

$$\Pi_{eff} = \Pi - \phi\psi^{est}.$$

$\Pi_{eff}$ is optimized with respect to all the independent variables. Again, a preferred method is the simulated annealing technique, though others could be used in simpler cases. The output from the optimization routine includes the optimized values of the independent variables, such as the price and quantity for each item, and the resulting values of the objective function and constraint function.

The resulting constraint value is the one that most closely matches the target constraint value. The level of agreement will depend in part upon the nature of the system being analyzed and in part on the resolution of the mapping.

(Step 1406)

The values of the independent variables, the resulting objective function and the constraint function are stored in the Target Value table. A judgment is made as to whether all the scenarios have been analyzed. If they have not, the situation of the routine returns to 1404; otherwise, the Scenario Analysis routine terminates.

Although in the routine described above, the Interpolation routine was used to obtain the estimate $\psi^{est}$, in an alternative embodiment this quantity may be determined by used of a root-finding technique. Many such techniques are well known in the art, and the particular choice will depend upon the known qualities of the system. One particular root-finding technique that is appropriate for discontinuous functions is the Van Wijngaarden-Dekker-Brent method, which is documented in W. Press et. al., *Numerical Recipes: The Art of Scientific Computing*, Cambridge University Press, New York (1992), and is herein incorporated by reference. The use of a root-finding technique is particularly desirable if the desired constraint target needs to be met with high accuracy. However, the root-finding technique will be computationally intensive for virtually every optimization of the effective objective function $\Pi_{eff}$. By contrast, the Interpolation routine makes use of data that has already been calculated and stored in the Constraint Overview table, making the scenario analysis computationally efficient.

FIG. 11 provides an example of how the predicted profits from a demand model could vary according to the price image of the that particular group of items. By using competitive data, a retail pricing manager could find out the price image of all the other stores competing in the market with their store. For example, suppose the manager determines that the store should have a price image of −6.0 (measured relative to the market), this corresponds to choosing a value −6.0 from the horizontal axis, and then having the system optimize prices such that the point X on the graph is attained, realizing a profit of $38,000.

Bounding Routine

Figure 8:
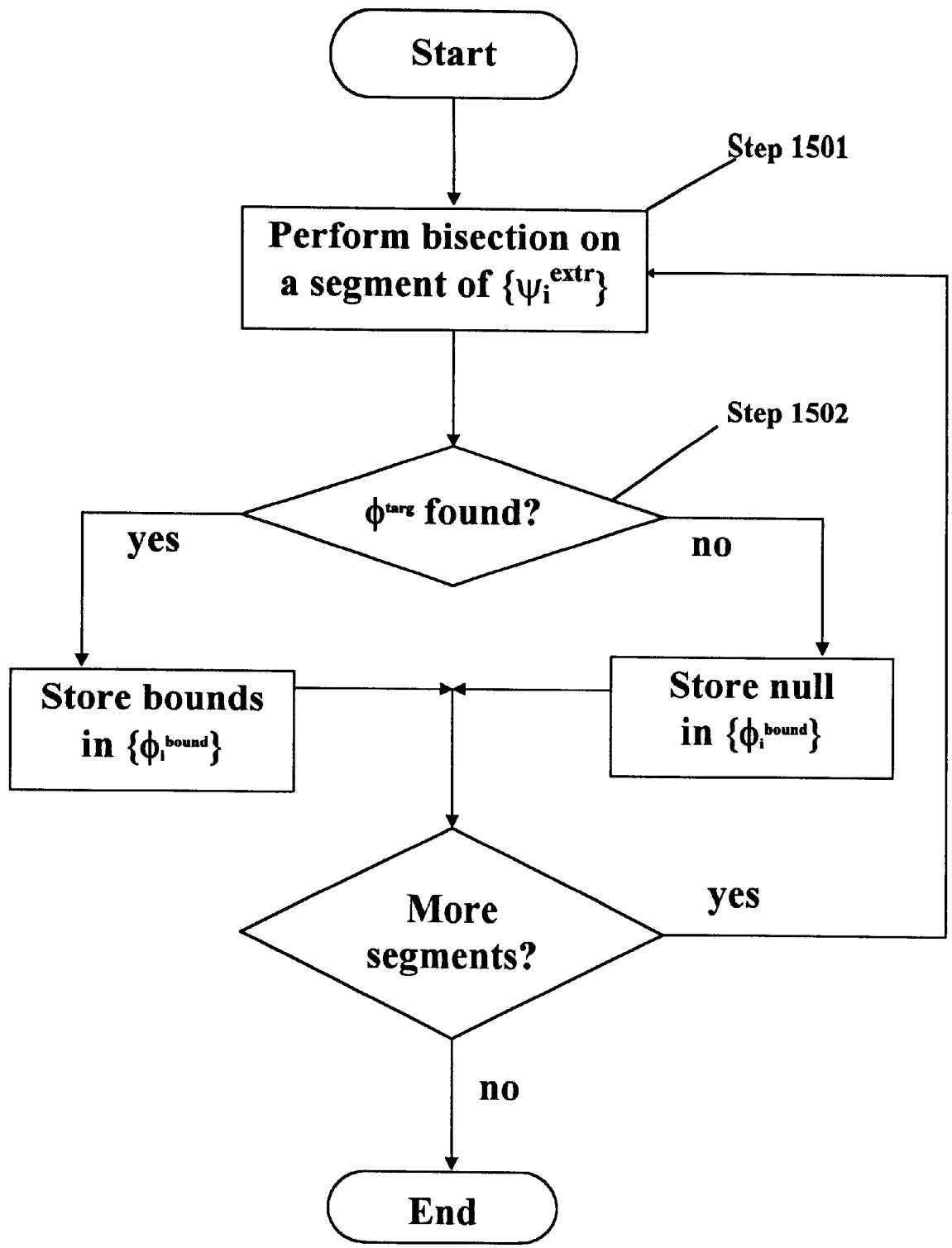
FIG. 8 is a flowchart of a preferred embodiment of the Bounding routine.

The purpose of the Bounding Routine is to determine the location in the Constraint Overview table in which the target value for the constraint functions can be found. The input to this routine is the Constraint Overview table, the constraint target value and the list of local minimums and maximums for ψ, denoted $\{\psi_i^{extr}\}$ The output from this routine is the entries in the table that bound these target values. A preferred embodiment of this routine will be described with reference to FIG. 8.

(Step 1501)

For each segment defined by $\{\psi_i^{extr}\}$, a bisection routine is performed to determine if the constraint target is contained in that segment.

(Step 1502)

If the constraint target is contained in that segment, then the bisection tells which entries in the Constraint Overview table corresponds to the bounds on the constraint target. These bounds, denoted as $\psi^{low}$ and $\psi^{high}$, for the lower and upper bounds, respectively, are stored in a list $\{\phi_i^{bound}\}$. If the constraint target is not contained in that segment, then a null value is returned.

A judgment is made as to whether all the listed segments defined by $\{\psi_i^{extr}\}$ have been analyzed. If they have not, the control of the routine is returned to step 1501. If they have, $\{\phi_i^{bound}\}$ is returned to the calling routine, including the cases where these variables are null. Using the data from FIG. 5B as an example, $\{\phi_i^{bound}\}$ for a particular list of target values for $\phi$ is shown.

Interpolation Routine

Figure 9:
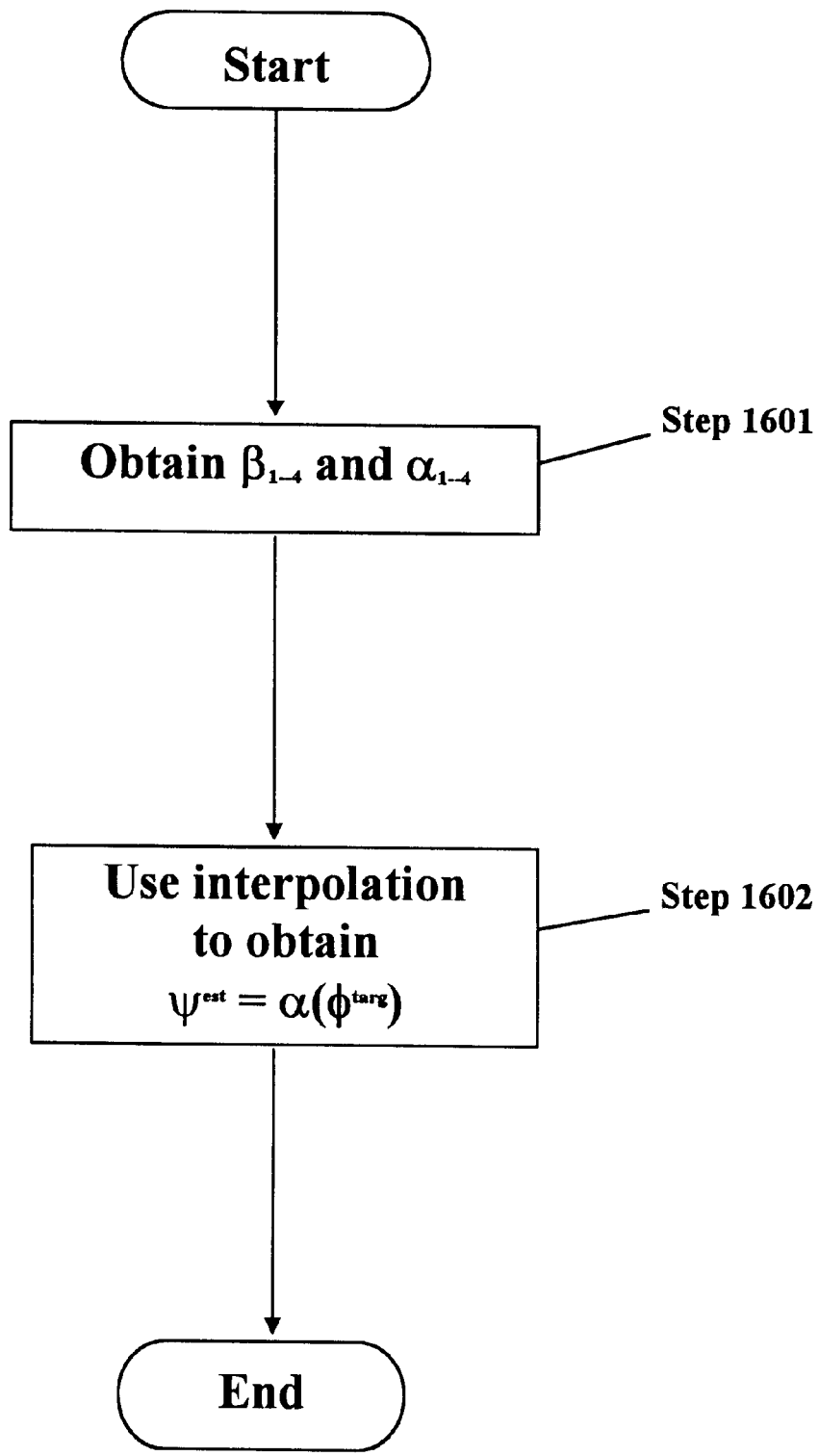
FIG. 9 is a flowchart of a preferred embodiment of the Interpolation routine.

This routine utilizes known interpolation techniques to interpolated a value of $\psi$ from the Constraint Overview Table. The input to this routine includes of: the Constraint Overview table; the specified target values for the constraint functions, given by $\phi^{targ}$, and the values $\psi^{low}$ and $\psi^{high}$ which bound the location in the table where the desired solution is to be targeted. The output from this routine is the value $\psi^{est}$, which is an interpolated value of a function $\psi(\phi)$ that is constructed from the part of the table containing $\psi^{low}$ and $\psi^{high}$. In general, this interpolated value can be constructed from any prior art interpolation routine, as long as the routine makes use of the data in the Constraint Overview table that is near the entries $\psi^{low}$ and $\psi^{high}$; otherwise, the accuracy of the interpolation will be compromised. Below we show one preferred embodiment of this interpolation routine with reference to FIG. 9.

(Step 1601)

The two values $\psi^{low}$ and $\psi^{high}$ are assigned to the variables $\alpha_2$ and $\alpha_3$, respectively. The values of corresponding entries of $\psi$ in the table are assigned to $\beta_2$ and $\beta_3$, respectively. The value of the constraint function $\phi$ in the Constraint Overview table immediately below $\alpha_2$ is assigned to $\alpha_1$, and the matching value of the constraint function $\phi$ is assigned to $\beta_1$. The value of $\psi$ in the Constraint Overview table immediately above $\alpha_3$ is assigned to $\alpha_4$, and the matching value of $\phi$ assigned to $\beta_4$. This is elucidated more clearly in FIG. 10. Note that this process is not affected by whether the Constraint Overview table is monotonic or not; the distinction is only used to determine whether or not there is a possibility of multiple solutions.

(Step 1602)

The values $\alpha_{1-4}$ and $\beta_{1-4}$ are used to construct an interpolated function $\alpha(\beta)$. This fourth-order interpolation is then used to obtain an approximation $\psi^{est}=\alpha(\phi^{targ})$. A preferred method for doing this is Neville's algorithm, which is described in W. Press et. al., *Numerical Recipes: The Art of Scientific Computing*, Cambridge University Press, New York (1992), and is herein incorporated by reference. The estimated value $\psi^{est}$ is then returned to the calling routine.

If the values $\psi^{low}$ and $\psi^{high}$ are located near the ends of the Constraint Overview table, such that there does not exist two values in the table which are lower or higher than $\phi^{targ}$, then the values for the $\alpha$'s and the $\beta$'s would need to be chosen in a slightly different manner. If there is only one value of $\phi$ in the Constraint Overview table that was lower than $\phi^{targ}$, then this one would be made $\beta_1$, the next three entries higher than $\phi^{targ}$ would be made $\beta_2$ through $\beta_4$, and the $\alpha$'s would be chosen accordingly. If there is only one value of $\phi$ in the Constraint Overview table that was higher than $\phi^{targ}$, then this one would be made $\beta_4$, and the next three entries lower than $\phi^{targ}$ would be made $\beta_1$ through $\beta_3$, and the $\alpha$'s would be chosen accordingly.

If the Constraint Overview table contains fewer than 4 entries of $\phi$, then the fourth-order interpolation would have to be replaced with a lower-order method, such as linear interpolation.

Having thus described a preferred embodiment of the Method for Controlled Optimization of Enterprise Planning Models, it should be apparent to those skilled in the art that certain advantages of the within method have been achieved. It should also be appreciated that numerous modifications, adaptations, and alternative embodiments thereof may be made within the scope and spirit of the present invention.

For example, the method described above may be extended to situations in which there is more than one auxiliary goal to be applied simultaneously. Instead of one constraint function $\phi$, representing one auxiliary goal, there would be a set $\{\phi_i\}$ of them—one constraint function for each auxiliary goal. Instead of a single variable $\psi$ there would be a set $\{\psi_i\}$, each member of which corresponds to one of the auxiliary goals. The effective objective function would thus be defined as:

$$\pi_{eff} = \pi - \sum_j \psi_j \phi_j,$$

and the map would exist in two or more dimensions, each of which corresponds to one of the auxiliary goals. The values of the $\psi_j$ would each be varied such that the multidimensional space spanned by them is captured by a discrete mapping within specified bounds $\psi_j^{min}$ and $\psi_j^{max}$ on each of the $\psi_j$. The simulated annealing technique would ideally be used to perform the optimization of the effective objective function $\Pi_{eff}$. Finally, the Constraint Overview table would hold data for the entire multi-dimensional map.

For the Scenario Analysis routine, a scenario would include of a group of target values $\{\phi_i^{targ}\}_j$ that each of the constraint functions should attain simultaneously. The effective objective function would again be constructed in a manner similar to the one described above. The main difference for the multiple constraint implementation is the determination of $\{\psi_i^{est}\}_j$, which are the values for the $\{\psi_i\}$ that yield the target $\{\phi_i^{targ}\}_j$. The Preprocessing, Bounding, and Interpolation routines would need to be adapted for multidimensional systems. However, once $\{\psi_i^{est}\}_j$ has been determined, the optimization of $\Pi_{eff}$ is again performed to yield the values for the independent variables that yield the desired $\{\phi_i^{targ}\}_j$ while optimizing the primary objective function $\Pi$.

The above description is presently the best contemplated mode of carrying out the invention. This illustration is made for the purposes of illustrating the general principles of the invention, and is not to be taken in a limiting sense. The scope of the invention is best determined by reference to the following claims.

What is claimed is:

1. A computer-implemented method for controlling the optimization of an enterprise planning model while simultaneously satisfying at least one strategic constraint not taken into account in said enterprise planning model, said method comprising the steps of:

selecting a primary goal including a set of operational decisions, wherein said primary goal is represented by a primary objective function, said primary objective function being dependent upon a set of operational variables with each of said operational variables corresponds to one of said operational decisions.;

selecting at least one auxiliary goal, a subset of said set of operational decisions, wherein said auxiliary goal is represented by a constraint function that is dependent upon a subset of said set of operational variables;

forming an effective goal by combining said primary goal with said at least one auxiliary goal such that said auxiliary goal acts as a constraint on said primary goal, wherein said effective goal is represented by an effective objective function, which depends on said set of operational variables, wherein said effective objective function is formed by applying a weighting factor to each constrain function, and subtracting each weighted constraint function from said primary objective function; and optimizing said effective goal with respect to each of said operational decisions through simulated annealing, thereby yielding a set of operational decisions that would maximize the primary goal, while simultaneously achieving said auxiliary goal, wherein said step of optimizing further includes optimizing said effective objective function with respect to each of said operational variables, thereby obtaining optimal values for each of said operational variables even when said set of operational variables includes at least one discrete variable.

2. A computer-implemented method for controlling the optimization of enterprise planning decisions through the application of a strategic constraint, said method comprising the steps of:

providing a data storage having enterprise data;

selecting a primary goal represented by a primary objective function, said primary objective function being dependent upon a set of operational variables, wherein each of said operational variables represents a single operational decision;

selecting an auxiliary goal represented by a constraint function that is dependent upon a subset of said set of operational variables, wherein said auxiliary goal is represented by a price image function given by:

$$\frac{1}{N}\sum_{i=1}^{N}\frac{P_i}{\overline{P}_i}\times w_i$$

where $\overline{P}_i$ is an average price of an item i in a market of interest, $w_i$ is a weighting function for item i and N is the total number of said items in the enterprise planning model;

selecting a targeted value for said auxiliary goal;

constructing an effective objective function, by combining said primary objective function with said constraint function multiplied by a weighting factor, said effective objective function depending from said set of operational variables;

selecting a weighting range for said auxiliary goal, wherein, for each weighting factor in said weighting range, said optimal values for said operational variables are utilized to determine the values of said primary goal and said auxiliary goal, and wherein the values of said primary goal, said auxiliary goal and said weighting factors are stored in a constraint overview table;

varying said weighting factor over said weighting range, wherein said steps of forming said effective function and optimizing said effective function are performed for each of said weighting factors in said weighting range;

interpolating data from said constraint overview table to estimate the value of the weighting factor that will yield that desired target value for said auxiliary goal;

repeating said steps of forming said effective goal and optimizing said effective goal for said estimated value of said weighting factor;

optimizing said effective objective function with respect to each of said operational variables, said enterprise data providing physical constraints on said optimization, thereby obtaining optimal values for each of said operational variables; and utilizing said optimal values of said operational variables to determine a value for said primary goal and a value for said auxiliary goal, whereby said optimal values of said operational variables represent a set of operational decisions that should achieve said determined primary goal and said determined auxiliary strategic goal.

* * * * *